June 16, 1959 R. K-F SCAL 2,890,863

COMBINED PRESSURE COOLING SYSTEM AND CHASSIS
FOR MINIATURIZED RADAR

Filed April 30, 1954

INVENTOR
ROBERT K-F SCAL

BY [signature]
Walter S. Paul
ATTORNEYS

United States Patent Office 2,890,863

Patented June 16, 1959

2,890,863

COMBINED PRESSURE COOLING SYSTEM AND CHASSIS FOR MINIATURIZED RADAR

Robert K-F Scal, Washington, D.C., assignor to the United States of America as represented by the Secretary of the Navy Application April 30, 1954, Serial No. 426,946

3 Claims. (Cl. 257—22)

The invention described herein may be manufactured and used by or for the Government of the United States of America for governmental purposes without the payment of any royalties thereon or therefor.

The present invention relates to a pressure cooling system and chassis for miniaturized radar and more particularly to a combined pressure cooling system and supporting chassis for miniaturized airborne radar.

The development of miniature electronic components has made possible noticeable reductions in both size and weight of airborne radar systems since these components can be assembled very compactly into a much smaller space than was previously the case. However, since the miniature components are called upon to transmit the same amounts of power as the larger units they replace, thus generating an equal or larger amount of heat, a cooling problem has arisen as a result of the greatly increased quantities of heat generated per unit of area of the system. The solution of this problem is complicated by the consideration of weight reduction since the addition of any separate cooling apparatus will negate a corresponding amount of weight saving. In addition, it is usually necessary to seal the electronic components within an air tight cabinet to maintain pressure at extremes of altitude in order to prevent arcing or corona of high voltage components or leads and to prevent contact with dust, salt air or moisture, thus ruling out direct cooling by the use of external air. The present invention provides a solution to the cooling problem without compromising any of the considerations of weight reduction, sealing or space requirements by incorporating a pressure cooling system in the chassis of the system.

An object of the present invention is the provision of a combined pressure cooling system and chassis for miniaturized airborne radar systems.

Another object is the provision of a pressure cooling system and chassis for miniaturized radar which permits protection of the electronic components of the system from the deleterious effects of dust, salt air, moisture, and similar substances.

A further object is the provision of a pressure cooling system and chassis for miniaturized radar which facilitates even cooling of all components of the system.

An additional object is the provision of a combined pressure cooling system and chassis for miniaturized airborne radar which has minimum weight and space requirements.

Figure 1:
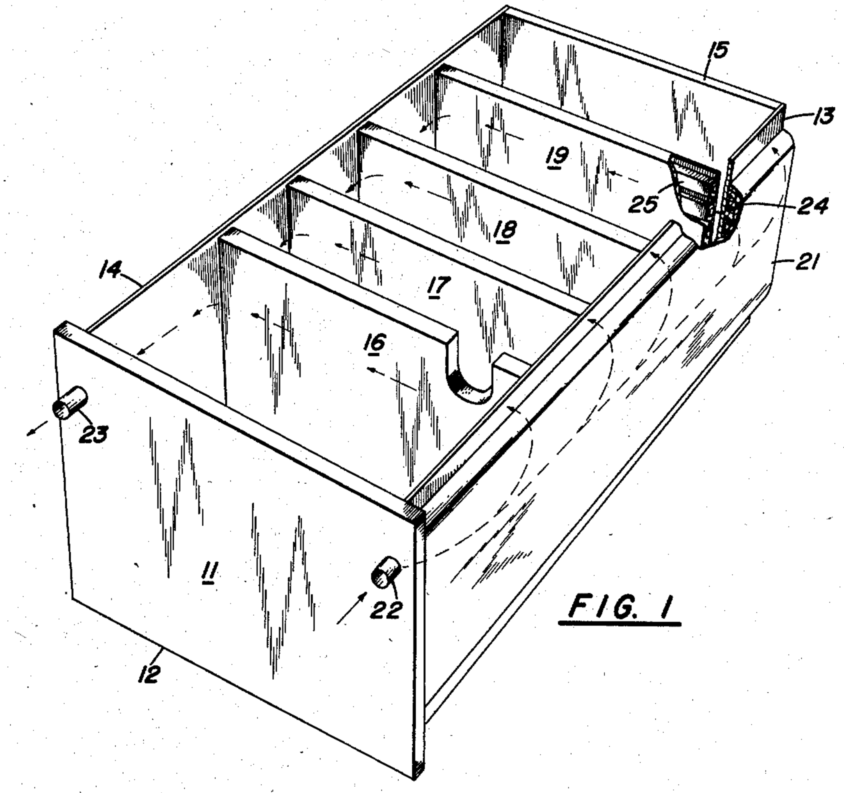
Figure 2:
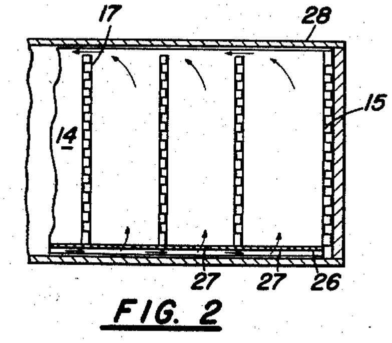

Other objects and many of the attendant advantages of this invention will be readily appreciated as the same becomes better understood by reference to the following detailed description when considered in conjunction with the accompanying drawing wherein:

Fig. 1 is a perspective view partly in section showing the cooling system and chassis of the present invention; and Fig. 2 is a partial side elevation view in section of the chassis of Fig. 1 assembled in a cabinet.

Referring more particularly to Fig. 1 of the drawing, a drawer-shaped radar chassis 11 is illustrated having a front wall 12, side walls 13 and 14, a rear wall 15 and spaced interior partitions 16, 17, 18 and 19. The side walls 13 and 14 are each provided with a hollow section 21 extending throughout its length. An air inlet 22 and an outlet 23 are secured to the front wall 12 and are connected to the hollow sections of the side walls 13 and 14 respectively. The rear wall 15 and the partitions 16–19 are provided with hollow interiors which are open to the hollow sections in both side walls, thus forming continuous air passages from the inlet 22 to the hollow section of side wall 13; through the interiors of partitions 16–19 and rear wall 15 to the hollow section of wall 14; and then to the outlet 23. To ensure that the passages are airtight, all the joints between the various walls and partitions are sealed. Each of the hollow sections, partitions and walls is provided with internal reinforcing, such as 24 and 25, which lends rigidity and strength to the structure and which may be positioned to serve as baffles to direct the flow of cooling air. The interior partitions 16–19 are so positioned relative to each other and to the front and rear walls as to define a plurality of compartments adapted to receive radar sub-assemblies.

As shown in Fig. 2, the upper edges of the interior partitions are spaced slightly below the upper edges of the side and end walls. A base panel 26 forms the bottom of the chasis 11 abutting the lower edges of the partitions. The base panel is spaced a short distance above the lower edges of the side and end walls and has one or more perforations opening into each of the compartments.

In operation, a sub-assembly is positioned in each of the compartments and the chassis is inserted into a cabinet 28 until the front wall of the chassis contacts the front edges of the cabinet forming an airtight seal therewith. A source of cooling air is then connected to inlet 22 and air is circulated through the walls and partitions as shown by the dotted lines in Fig. 1. As the radar system is operated, the heat generated by the sub-assemblies is transferred to the surrounding walls and partitions and then further transferred to the circulating cooling air which is exhausted through outlet 23. Since the individual sub-assemblies contain different components the quantity of heat generated by one will vary from that generated by another, thus requiring greater cooling in one part of the chassis than in another. The quantities of cooling air circulated around each of the different compartments can be varied by plugging portions of the various partitions or the heat generated within the various compartments can be distributed evenly throughout the entire chassis. This latter alternative is accomplished by means of the structure of Fig. 2. A small fan (not shown) is positioned in the compartment defined by the front wall and partition 16 to circulate the air therein through the perforations in the base panel; along the space between the base panel and the cabinet; up through the remaining perforations in the base panel; past the various sub-assemblies; and back over the upper edges of the partitions as shown by the arrows in Fig. 2. This circulation of air within the cabinet not only distributes the heat evenly throughout the chassis, but also renders the cooling system more efficient, since the entire surface areas of the various walls and partitions act as cooling surfaces instead of merely those areas adjacent the heat generating elements.

The present invention provides a means of cooling a radar system by the use of external air without exposing the elements of the system to any of the deleterious effects of such air. Since the air within the compartments is sealed in when the chassis is inserted in the cabinet, the radar system can safely be used in the presence of dust, moisture, salt air, or similar harmful substances. If the present invention is mounted in a vehicle, such as an aircraft, ram or jet air from the exterior of the vehicle can be used as cooling air, or if desired, the air within the vehicle can be utilized for cooling by attaching a small air pump to the inlet.

Obviously many modifications and variations of the present invention are possible in the light of the above teachings. It is therefore to be understood, that within the scope of the appended claims, the invention may be practiced otherwise than as specifically described.

What I claim is:

1. In a chassis for radar equipment, a drawer comprising a perforated base panel, a front wall and a hollow rear wall, hollow side walls and a hollow partition extending between said side walls, said walls and partition being connected to form a circulatory path, said base panel being above the bottom edges of said walls, the upper edge of said partition being below the upper edge of said walls, said front wall extending laterally beyond said side walls, a sleevelike cabinet into which said drawer may be slid, the front edge of said cabinet providing an air tight seal along the rear face of said front wall, the cabinet contacting the upper and lower edges of said side walls, and means to introduce into and remove cooling air from said circulatory path, whereby said walls and partition serve as a cooling chassis and whereby sealed-in air may be circulated within said drawer.

2. In a chassis for radar equipment, a drawer comprising a perforated base panel, a front wall, a hollow rear wall and hollow side walls, a hollow partition extending between said side walls, said walls and partitions being connected to form a circulatory path, said base panel being above the bottom edges of said walls, the upper edge of said partition being below the upper edge of said walls, said front wall extending laterally beyond said side walls, a sleeve like cabinet into which said drawer may be slid, the front edge of said cabinet providing an air tight seal along the rear face of said front wall, the cabinet contacting the upper and lower edges of said side walls, means in said front wall to introduce into and remove cooling air from said circulatory path, whereby said walls and partition serve as a cooling chassis and provide a circulatory path for cooling air and whereby sealed-in air may circulate within said drawer, and means in said chassis for increasing the circulation of said sealed-in air.

3. In a chassis for radar equipment, a drawer comprising a front wall and a hollow rear wall, hollow side walls and a hollow partition extending between said side walls to thereby divided the chassis into compartments, said walls and partition being connected to form a circulatory path, passage means connecting said compartments, a sleeve like cabinet adapted to receive said chassis, means to provide an air tight seal between said chassis and said cabinet, means to introduce into and remove cooling air from said circulatory path, and means to circulate sealed-in air between the compartments of said chassis.

References Cited in the file of this patent

UNITED STATES PATENTS

| | | |
|---|---|---|
| 1,310,665 | Kleineider | July 22, 1919 |
| 1,344,057 | Moore | June 22, 1920 |
| 1,952,422 | Copeman | Mar. 27, 1934 |
| 2,187,011 | Braden | Jan. 16, 1940 |
| 2,394,060 | Holmes | Feb. 5, 1946 |
| 2,517,686 | Larkin | Aug. 8, 1950 |
| 2,553,471 | Protzeller | May 15, 1951 |